(12) United States Patent
Fujiwara et al.

(10) Patent No.: US 8,306,226 B2
(45) Date of Patent: *Nov. 6, 2012

(54) TRANSMITTING APPARATUS, RECEIVING APPARATUS, AND CONTENT TRANSMITTING METHOD

(75) Inventors: Yoshinobu Fujiwara, Yokohama (JP); Tatsuyuki Matsushita, Kawasaki (JP); Hiroshi Isozaki, Kawasaki (JP); Kunio Honsawa, Ome (JP); Kazunobu Konda, Tokyo (JP); Chikara Ushimaru, Hamura (JP); Yoshihisa Kizuka, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1029 days.

This patent is subject to a terminal disclaimer.

(21) Appl. No.: 12/199,925

(22) Filed: Aug. 28, 2008

(65) Prior Publication Data

US 2009/0060196 A1 Mar. 5, 2009

(30) Foreign Application Priority Data

Aug. 31, 2007 (JP) ................................. 2007-226771

(51) Int. Cl.
*H04L 29/06* (2006.01)
*G06F 21/00* (2006.01)
(52) U.S. Cl. ........................................ 380/259; 380/201
(58) Field of Classification Search .................. 380/259, 380/201
See application file for complete search history.

(56) References Cited

U.S. PATENT DOCUMENTS

2005/0037721 A1* 2/2005 Benz et al. ................. 455/187.1
2007/0180224 A1* 8/2007 Nakano et al. ............... 713/150

FOREIGN PATENT DOCUMENTS

| JP | 2004-172870 | | 6/2004 |
|---|---|---|---|
| JP | 2005158056 | * | 6/2005 |
| JP | 2006-338779 | | 12/2006 |

OTHER PUBLICATIONS

U.S. Appl. No. 12/332,858, filed Dec. 11, 2008, Fujiwara, et al.
"Digital Transmission Content Protection Specification", vol. 1, Revision 1.5 (Informational Version), Licensed by DTLA (Digital Transmission Licensing Administrator), http://www.dtcp.com/, Jun. 15, 2007, pp. 1-81.
"Mapping DTCP to IP", DTCP vol. 1, Supplement E, Revision 1.2 (Informational Version), Licensed by DTLA (Digital Transmission Licensing Administrator), http://www.dtcp.com/, Jun. 15, 2007, pp. 1-46.

* cited by examiner

*Primary Examiner* — Farid Homayounmehr
*Assistant Examiner* — Lisa Lewis
(74) *Attorney, Agent, or Firm* — Oblon, Spivak, McClelland, Maier & Neustadt, L.L.P.

(57) ABSTRACT

A transmitting apparatus includes a transaction transmitting unit configured to transmit to a receiving apparatus a content to be moved to the receiving apparatus, by using a first transaction established with the receiving apparatus, a counter unit configured to count a progress quantity representing a degree of progress of the transmission of the content from a given point of time with respect to the transmission of the content corresponding to the first transaction to obtain a count value, and a transaction switching unit configured to switch the first transaction used for the transmission of the content to a second transaction, if the count value of the counter unit reaches a predetermined value and the transmission of the content is not completed.

22 Claims, 13 Drawing Sheets

| Content name | Associated transaction |
|---|---|
| Content C | Transaction D |
| | |
| | |

FIG. 5

| Content name | Associated transaction |
|---|---|
| Content C | Transaction D |
| Content C | Transaction E |
| | |

FIG. 6

| Content | Transaction | Secret key number | Value calculated from secret key |
|---|---|---|---|
| C | D | Label_K1 | MAC(K1) |
| C | E | Label_K2 | MAC(K2) |

FIG. 7

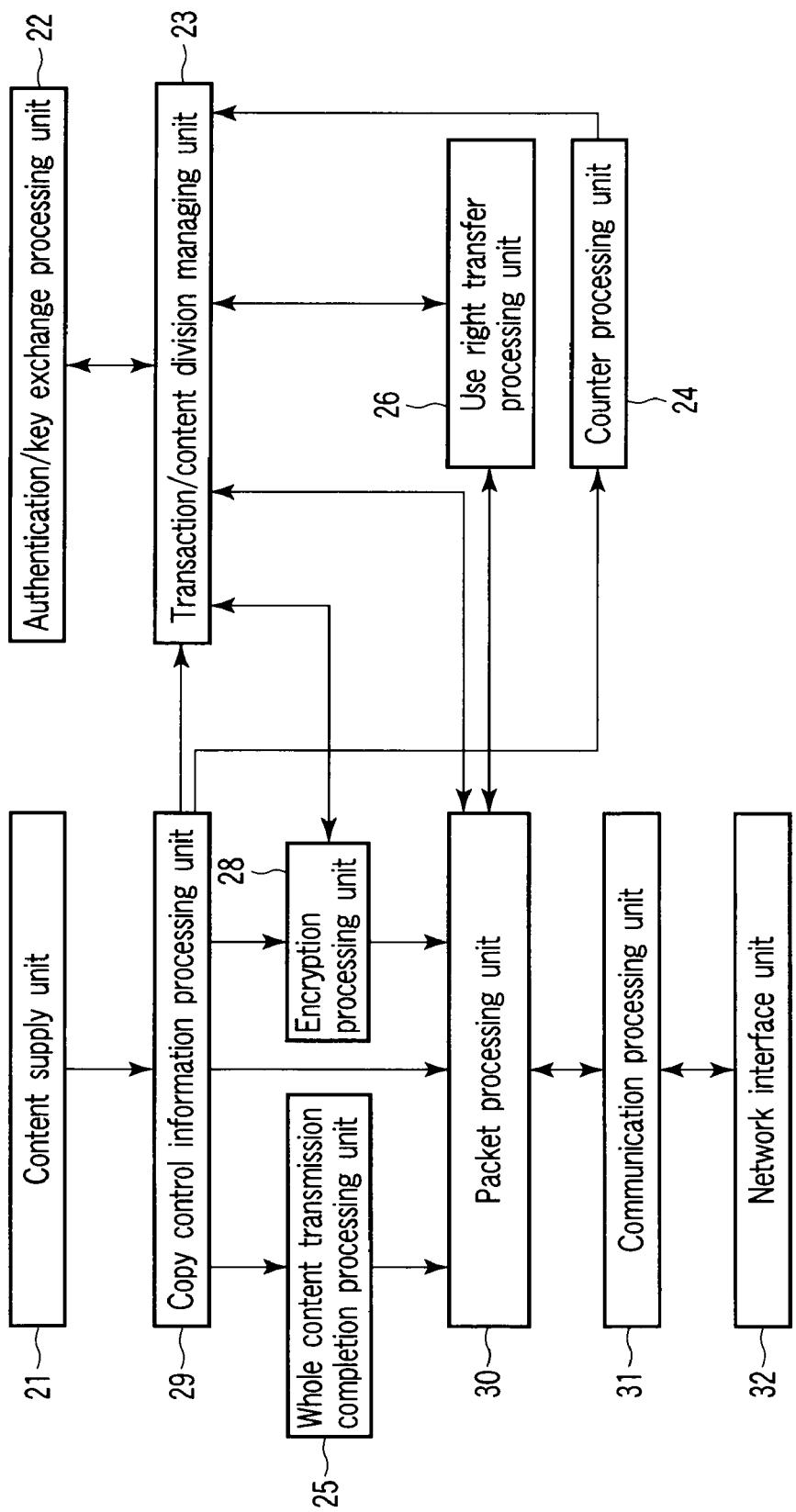
F I G. 14

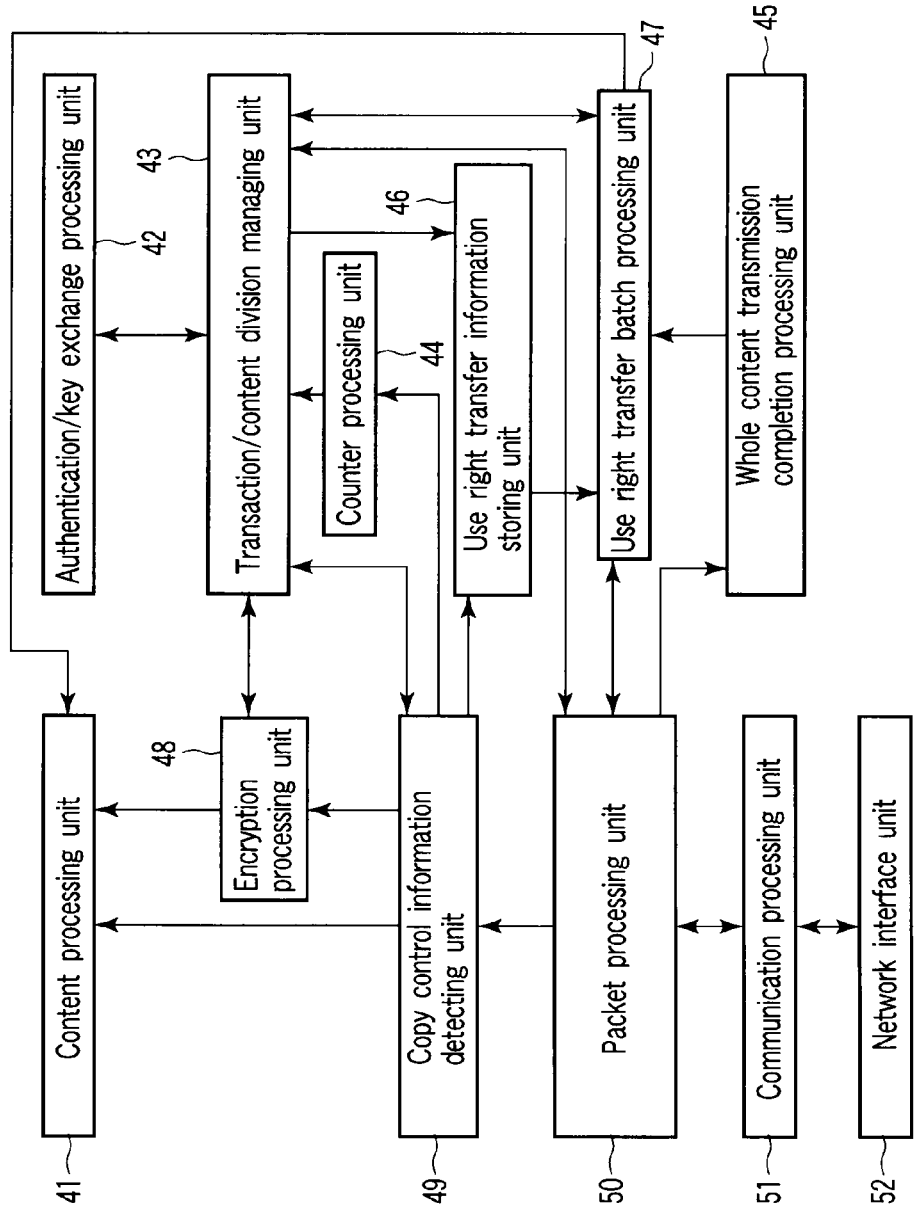
F I G. 15

TRANSMITTING APPARATUS, RECEIVING APPARATUS, AND CONTENT TRANSMITTING METHOD

CROSS-REFERENCE TO RELATED APPLICATIONS

This application is based upon and claims the benefit of priority from prior Japanese Patent Application No. 2007-226771, filed Aug. 31, 2007, the entire contents of which are incorporated herein by reference.

BACKGROUND OF THE INVENTION

1. Field of the Invention

The present invention relates to a transmitting apparatus which transmits contents, a receiving apparatus which receives contents, and a content transmitting method.

2. Description of the Related Art

In recent years, along with the spread of computer networks such as a broadband network and wireless LAN, digital information apparatuses or digital household appliances having a communication function have prevailed. Digital broadcasting-compatible TV sets, set-top boxes, DVD recorders, and the like will become more popular. If these digital information apparatuses and the like are connected to networks, users can enjoy contents via the networks.

The contents include various types of digital data, e.g., moving image data and audio data complying with MPEG2 or MPEG4, or document data such as text data and image data. Advantageously, the contents including such digital data can be readily copied without degradation. However, caution must be exercised for the copyrights on the contents.

A mechanism of transmitting/receiving copyright protected contents between transmitting and receiving apparatuses via a network has been proposed (see, e.g., a document available at www.dtcp.com (a PDF file linked to the item "Other DTCP Informational Specifications" in the above URL)).

A copyright protected content has copy control information, and a copy or move of the content is controlled according to the copy control information. For example, copy control information "No-more-copies" represents that no more copies can be made but a move is permitted.

Various methods are available for moving a content with the copy control information "No-more-copies" while protecting the copyright on the content. For example, a method can be implemented by the following three steps.

(1) Authentication/key exchange processing is executed between transmitting and receiving apparatuses.

(2) A content is copied from the transmitting apparatus to the receiving apparatus in an "unusable state". At this time, a content in a "usable state" exists in the transmitting apparatus.

(3) The content in a "usable state" in the transmitting apparatus is set to an "unusable state", and the content in an "unusable state" in the receiving apparatus is set to a "usable state". This processing is referred to as content use right transfer processing.

This method is called a transaction move, and the above three steps constitute one transaction.

In the mechanism of transmitting/receiving copyright protected contents between transmitting and receiving apparatuses via a network, there may be a rule that "the receiving apparatus must discard a decryption key if it does not use the decryption key for a predetermined period of time".

Consider a move of an edit content containing a plurality of portions with different pieces of copy control information. Such content is, for example, a content obtained by concatenating content 1 with copy control information "No-more-Copies", content 2 with copy control information "Copy-free", and content 3 with copy control information "No-more-Copies".

First, authentication/key exchange processing is executed between the transmitting and receiving apparatuses to share a secret key to be used for encryption and decryption. Assume that an edit content containing a portion not requiring encryption with copy control information "Copy-free" is moved. The receiving apparatus discards the secret key when the predetermined period of time elapses after the start of receiving the portion not requiring encryption. If the transmitting apparatus continuously transmits a portion requiring encryption with copy control information "No-more-Copies", it encrypts the portion requiring encryption using the secret key and transmits it to the receiving apparatus. Since the receiving apparatus has discarded the secret key, it cannot decrypt the subsequent portion requiring encryption.

In case of moving a content, it is often difficult for the transmitting apparatus to determine whether the receiving apparatus is an authentic receiving apparatus which shares the secret key. Therefore, even if the receiving apparatus requests the authentication/key exchange processing again to share the secret key with the transmitting apparatus, it is difficult for the receiving apparatus to acquire the secret key.

The following method is also available.

(1) A transmitting apparatus divides an edit content.

(2) The divided contents are moved from the transmitting apparatus to a receiving apparatus as separate contents.

(3) The receiving apparatus concatenates the divided contents to reconstruct the original content.

In this method, however, it is impossible to smoothly concatenate the divided contents.

Note that "it is impossible to smoothly concatenate the divided contents" means that when video data are played back, it is impossible to smoothly play back the contents due to a frame loss. If, for example, an MPEG2 content is divided at a Close I picture as an ideal position and then the divided contents are concatenated, it is possible to smoothly play back the content. If, however, the content is divided at a position other than the ideal position, some of P pictures and B pictures at the start portion of the second divided content are discarded. Consequently, even if the divided contents are concatenated, it is impossible to smoothly play back the content without the discarded pictures.

In JP-A 2006-338779(KOKAI), to solve the above problems, management information is created before a content is divided, and the divided contents are smoothly concatenated using both the management information on the content prior to the division and management information on the divided contents. If, however, it is impossible to create management information in advance in terms of copyright protection, it is impossible to use this method and to smoothly concatenate the divided contents.

As described above, under the circumstances in which a secret key may be discarded due to copyright protection, it is difficult to reliably move a content from a transmitting apparatus to a receiving apparatus without losing part of the content.

BRIEF SUMMARY OF THE INVENTION

According to an aspect of the present invention, there is provided a transmitting apparatus which includes a transaction transmitting unit configured to transmit to a receiving apparatus a content to be moved to the receiving apparatus, by using a first transaction established with the receiving apparatus, a counter unit configured to count a progress quantity representing a degree of progress of the transmission of the content from a given point of time with respect to the transmission of the content corresponding to the first transaction to obtain a count value, and a transaction switching unit configured to switch the first transaction used for the transmission of the content to a second transaction, if the count value of the counter unit reaches a predetermined value and the transmission of the content is not completed.

According to another aspect of the present invention, there is provided a receiving apparatus which includes a transaction receiving unit configured to receive from a transmitting apparatus a content to be moved, by using a first transaction established with the transmitting apparatus, a counter unit configured to count a progress quantity representing a degree of progress of the reception of the content from a given point of time with respect to the reception of the content corresponding to the first transaction to obtain a count value, and a transaction switching unit configured to switch the first transaction used for the reception of the content to a second transaction, if the count value of the counter unit reaches a predetermined value and the reception of the content is not completed.

BRIEF DESCRIPTION OF THE SEVERAL VIEWS OF THE DRAWING

FIG. 5 is a view for explaining the management of a content and a transaction;

FIG. 6 is a view for explaining the management of a content and transactions;

FIG. 7 is a view showing an example of information for transferring a use right;

FIG. 14 is a block diagram showing an arrangement example of a transmitting apparatus according to the second embodiment;

FIG. 15 is a block diagram showing an arrangement example of a receiving apparatus according to the second embodiment;

DETAILED DESCRIPTION OF THE INVENTION

The embodiments of the present invention will be described below with reference to the accompanying drawings.

(First Embodiment)

Figure 1:
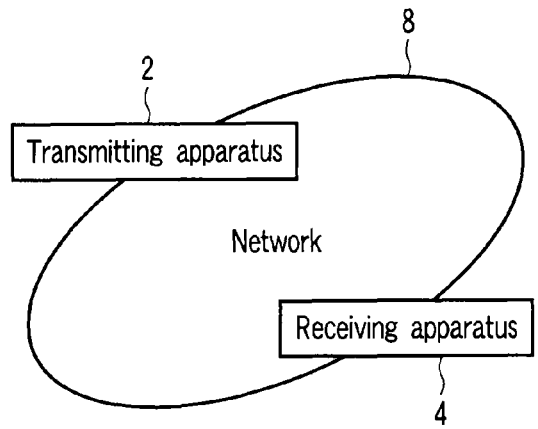
FIG. 1 is a view showing an arrangement example of a content transmitting/receiving system according to the first embodiment.

Referring to FIG. 1, reference numeral 2 denotes a transmitting apparatus; 4, a receiving apparatus; and 8, a network.

The transmitting apparatus 2 transmits, to the receiving apparatus 4 via the network 8, a content to be moved. The receiving apparatus 4 receives, via the network 8, the content transmitted from the transmitting apparatus 2.

In this embodiment, the content transferred from the transmitting apparatus 2 to the receiving apparatus 4 is "digital data requiring copyright protection", i.e., "digital data to be transmitted after copyright protection".

In this embodiment, assume that the "digital data requiring copyright protection" is digital data which is prohibited from being copied but is allowed to be moved. Assume also that the transmitting apparatus 2 transfers the "digital data requiring copyright protection" to the receiving apparatus 4 after encryption.

Note that this content may contain only "digital data requiring copyright protection", or may contain "digital data not requiring copyright protection" (i.e., digital data which is allowed to be freely copied and can be transferred without encryption) in addition to the "digital data requiring copyright protection".

Such content will be simply referred to as a content hereinafter.

In the following explanation, a "progress quantity representing a degree of progress of the transmission of a content" indicates a progress quantity with respect to the transmission of a content during a period of time from a given point of time (e.g., from the start of transmitting a content) to another given point of time. For example, the progress quantity indicates a period of time (transmission time) from the start of transmitting a content to a certain point of time, or the amount of data transmitted (transmitted data amount) during a period of time from the start of transmitting a content to a certain point of time.

Furthermore, a "progress quantity representing a degree of progress of the reception of a content" used in the following explanation indicates a progress quantity with respect to the reception of a content during a period of time from a given point of time (e.g., from the start of receiving a content) to another given point of time. For example, the progress quantity indicates a period of time (reception time) from the start of receiving a content to a certain point of time, or the amount of data received (received data amount) during a period of time from the start of receiving a content to a certain point of time.

In this embodiment, to move a content from the transmitting apparatus 2 to the receiving apparatus 4, the following control is generally executed. That is, to move the content, the transmitting apparatus 2 or receiving apparatus 4 switches transactions every time the progress quantity representing a degree of progress of the transmission or reception of the content exceeds a predetermined value (e.g., every time a period of time taken for the transmission or reception exceeds a predetermined period of time, or every time a transmitted or received data amount exceeds a predetermined data amount)

after the start of moving the content from the transmitting apparatus 2 to the receiving apparatus 4.

As the network 8, Ethernet™, wired network using, e.g., IEEE1394 or USB, or a wireless network using, e.g., IEEE802.11 or Bluetooth™ may be used.

Although only one transmitting apparatus 2 is shown in the network 8 of FIG. 1, a plurality of transmitting apparatuses may exist. The same goes for the receiving apparatus 4, too. Although only the transmitting apparatus 2 and receiving apparatus 4 are shown in the network 8 of FIG. 1, apparatuses other than the transmitting apparatus 2 and receiving apparatus 4 may be connected.

Figure 2:
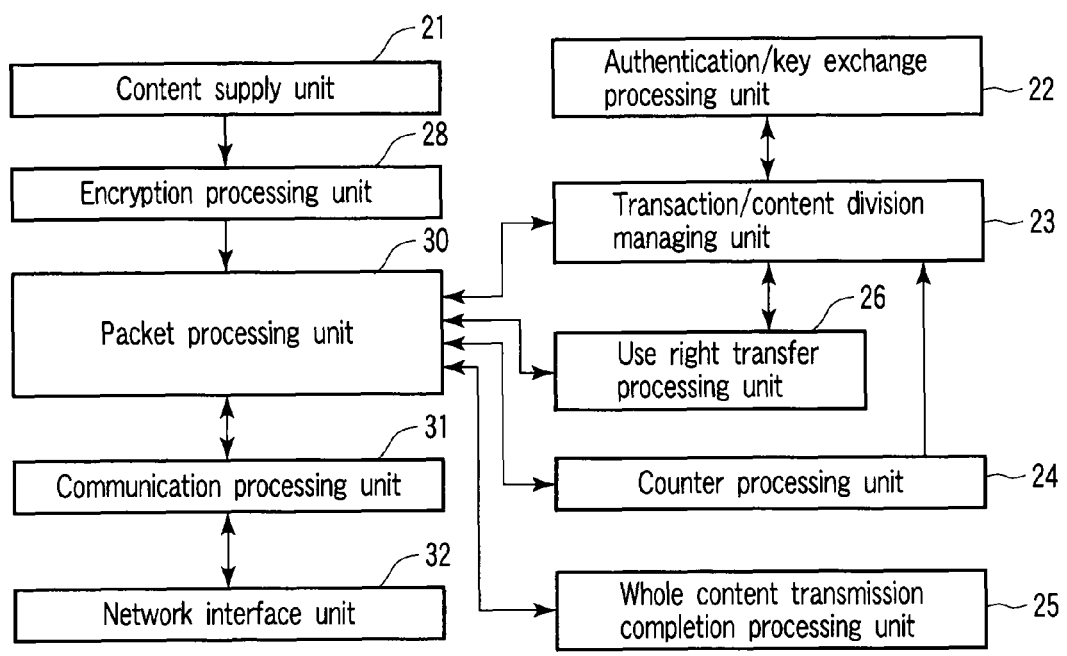
FIG. 2 is a block diagram showing an arrangement example of a transmitting apparatus according to the first embodiment.

FIG. 2 shows an arrangement example of the transmitting apparatus 2 according to this embodiment.

As shown in FIG. 2, the transmitting apparatus 2 comprises a content supply unit 21, authentication/key exchange processing unit 22, transaction/content division managing unit 23, counter processing unit 24, whole content transmission completion processing unit 25, use right transfer processing unit 26, encryption processing unit 28, packet processing unit 30, communication processing unit 31, and network interface unit 32.

The content supply unit 21 supplies, to the packet processing unit 30, a content to be moved.

When a transaction is established and transmission of a content by the transaction starts, the counter processing unit 24 starts counting a progress quantity representing a degree of progress of the transmission of the content (e.g., a transmission time or transmitted data amount). When the progress quantity exceeds a predetermined value (e.g., when the transmission time exceeds a predetermined period of time or the transmitted data amount exceeds a predetermined data amount), the transmitting apparatus 2 requests a new transaction and transaction switching.

The transaction/content division managing unit 23 stores and manages the relationship between the content and the transaction, creates a new transaction with the receiving apparatus 4, and executes transaction switching.

Upon completion of the transmission of the whole content, the whole content transmission completion processing unit 25 notifies the receiving apparatus 4 that "the transmission of the whole content is complete".

The use right transfer processing unit 26 executes processing for transferring, from the transmitting apparatus 2 to the receiving apparatus 4, the use right of the content to be moved. Furthermore, the unit 26 creates and manages information used in this processing.

The encryption processing unit 28 encrypts or decrypts the data to be transmitted/received, by using a secret key which is shared by executing the authentication/key exchange processing.

The packet processing unit 30 executes network layer processing and transport layer processing (e.g., processing of packetizing content data or a command for use right transfer processing to be transmitted to the receiving apparatus 4).

The communication processing unit 31 executes data link layer processing.

The network interface unit 32 performs processing of the physical layer, e.g., Ethernet™.

The authentication/key exchange processing unit 22 executes authentication/key exchange processing between itself and the receiving apparatus 4 (an authentication/key exchange processing unit of the receiving apparatus 4). In the authentication/key exchange processing, when each of the transmitting apparatus 2 and the receiving apparatus 4 authenticates that the other is an apparatus given a license from a specific license organization, and can confirm that the other is an authentic apparatus, a secret key (shared key) is created. That is, when the authentication/key exchange processing succeeds, the transmitting apparatus 2 and receiving apparatus 4 can share a secret key to be used for encrypting and decrypting the content. As the authentication method, a well-known method such as ISO/IEC 9798-3 or ISO/IEC 9798-2 can be used.

Figure 3:
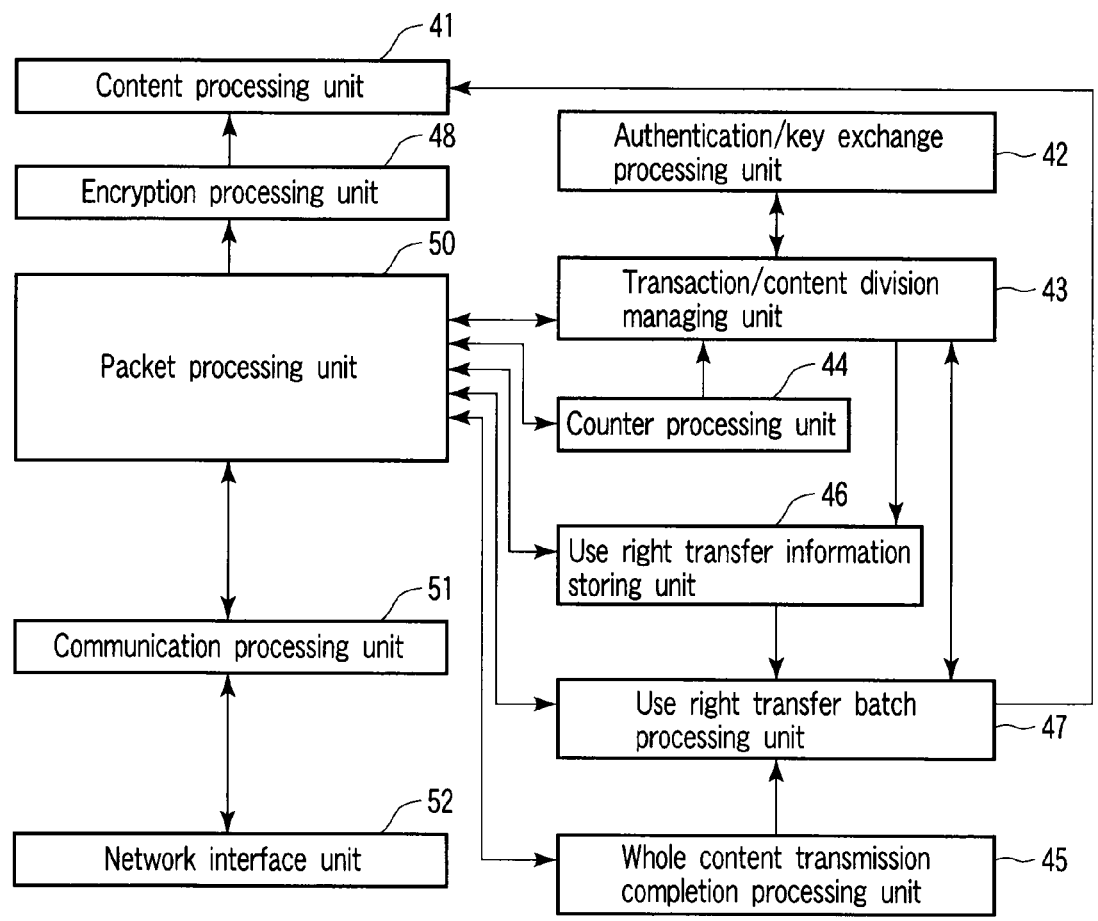
FIG. 3 is a block diagram showing an arrangement example of a receiving apparatus according to the first embodiment.

As shown in FIG. 3, the receiving apparatus 4 comprises a content processing unit 41, authentication/key exchange processing unit 42, transaction/content division managing unit 43, counter processing unit 44, whole content reception completion processing unit 45, use right transfer information storing unit 46, use right transfer batch processing unit 47, encryption processing unit 48, packet processing unit 50, communication processing unit 51, and network interface unit 52.

Each of the authentication/key exchange processing unit 42, transaction/content division managing unit 43, encryption processing unit 48, packet processing unit 50, communication processing unit 51, and network interface unit 52 basically has the same function as that of the corresponding block of the transmitting apparatus 2.

The content processing unit 41 executes, for example, processing for outputting the received content (to be moved) to a display device or storing it.

When a transaction is established and reception of the content by the transaction starts, the counter processing unit 44 starts counting a progress quantity representing a degree of progress of the reception of the content (e.g., a reception time or received data amount). When the progress quantity exceeds a predetermined value (e.g., when the reception time exceeds a predetermined period of time or the received data amount exceeds a predetermined data amount), the receiving apparatus 4 requests a new transaction and transaction switching.

Upon reception of the notification from the transmitting apparatus 2 that "the transmission of the whole content is complete", the whole content reception completion processing unit 45 requests use right transfer processing (transfer batch processing).

The use right transfer information storing unit 46 creates and stores information to be used in the use right transfer processing.

The use right transfer batch processing unit 47 collectively executes use right transfer processes of all transactions associated with the content (to be moved).

Although both the transmitting apparatus 2 and receiving apparatus 4 have the counter processing unit, only one of the transmitting apparatus 2 and receiving apparatus 4 may have the counter processing unit.

A case in which a content is moved from the transmitting apparatus 2 to the receiving apparatus 4 will be described below with reference to FIG. 4.

<Authentication/Key Exchange Processing>

When a content move request is issued from the transmitting apparatus 2 to the receiving apparatus 4 (or from the receiving apparatus 4 to the transmitting apparatus 2) (step S11), authentication/key exchange processing is executed between the authentication/key exchange processing unit 22 of the transmitting apparatus 2 and the authentication/key exchange processing unit 42 of the receiving apparatus 4 (step S12) and a transaction starts.

Let C be an identifier of a content to be moved, D be an identifier of the started transaction, and K1 be a secret key (to be used in transaction D) which is shared between the transmitting apparatus 2 and receiving apparatus 4 by executing the authentication/key exchange processing.

The transaction/content division managing unit 23 of the transmitting apparatus 2 and the transaction/content division managing unit 43 of the receiving apparatus 4 respectively manage the content identifier (C) and the transaction identifier (D) in association with each other, as shown in FIG. 5. At this time, it is desirable to lock the content so that even if the transmitting apparatus 2 receives a content move request for the same content from another receiving apparatus, it can deny the request.

<Content Transmitting/Receiving Processing>

When the authentication/key exchange processing in transaction D succeeds, the transmitting apparatus 2 packetizes the content supplied from the content supply unit 21 into a predetermined packet in the packet processing unit 30, and transmits the packet to the receiving apparatus 4 via the communication processing unit 31 and network interface unit 32 (step S13). At this time, the encryption processing unit 28 encrypts the data to be transmitted, by using secret key K1, as needed.

When the receiving apparatus 4 receives the packet via the network interface unit 52 and communication processing unit 51, the packet processing unit 50 extracts a content from the packet, and outputs the content to the content processing unit 41 (step S13). At this time, the encryption processing unit 48 decrypts the received data, by using secret key K1, as needed.

A content storing unit built into the content supply unit 21 of the transmitting apparatus 2 or a content storing unit connected to the content supply unit 21 stores the content to be moved in a usable state (valid state). For example, a flag corresponding to the content is provided, and set to indicate a valid state. The flag may be held in, e.g., a flash memory.

A content storing unit built into the content processing unit 41 of the receiving apparatus 4 or a content storing unit connected to the content processing unit 41 stores the received content in an unusable state (invalid state). For example, a flag corresponding to the content is provided, and set to indicate an invalid state. The flag may be held in, e.g., a flash memory.

Upon start of transmission to the receiving apparatus 4, the counter processing unit 24 of the transmitting apparatus 2 starts a counter (to be referred to as counter D1 hereinafter) corresponding to transaction D (step S14).

On the other hand, upon reception of the first packet from the transmitting apparatus 2, the counter processing unit 44 of the receiving apparatus 4 starts a counter (to be referred to as counter D2 hereinafter) corresponding to transaction D (step S15).

Note that the counters may be a time counter which counts the time taken for the transmission or reception, or may be a data size counter which counts a transmitted or received data amount.

<Counter Processing>

Each of the transmitting apparatus 2 and receiving apparatus 4 monitors the corresponding counter (counter D1 for the transmitting apparatus 2 or counter D2 for the receiving apparatus 4) while packetizing and transferring the content. If "the transmission of the whole content is not completed" and "the counter exceeds a predetermined value", the use right transfer processing unit 26 and the use right transfer information storing unit 46 respectively create and store information for transferring a use right (steps S16 and S17). The transaction/content division managing unit 23 or transaction/content division managing unit 43 requests another new transaction to a communication partner (the receiving apparatus 4 or transmitting apparatus 2) (step S18). If, however, the communication partner (the receiving apparatus 4 or transmitting apparatus 2) has already requested another new transaction, the unit 23 or 43 need not request another new transaction.

The predetermined value for the counter may be set to a general value (a constant value) or may be adaptively defined. In the latter case, by using, e.g., a function having a transmission rate as a parameter is used, the predetermined value may adaptively change in accordance with the transmission rate.

The processing of creating and storing information for transferring a use right needs to be executed before the secret key is discarded. The processing may be therefore performed immediately after the authentication/key exchange processing or after a request for another transaction.

Figure 4:
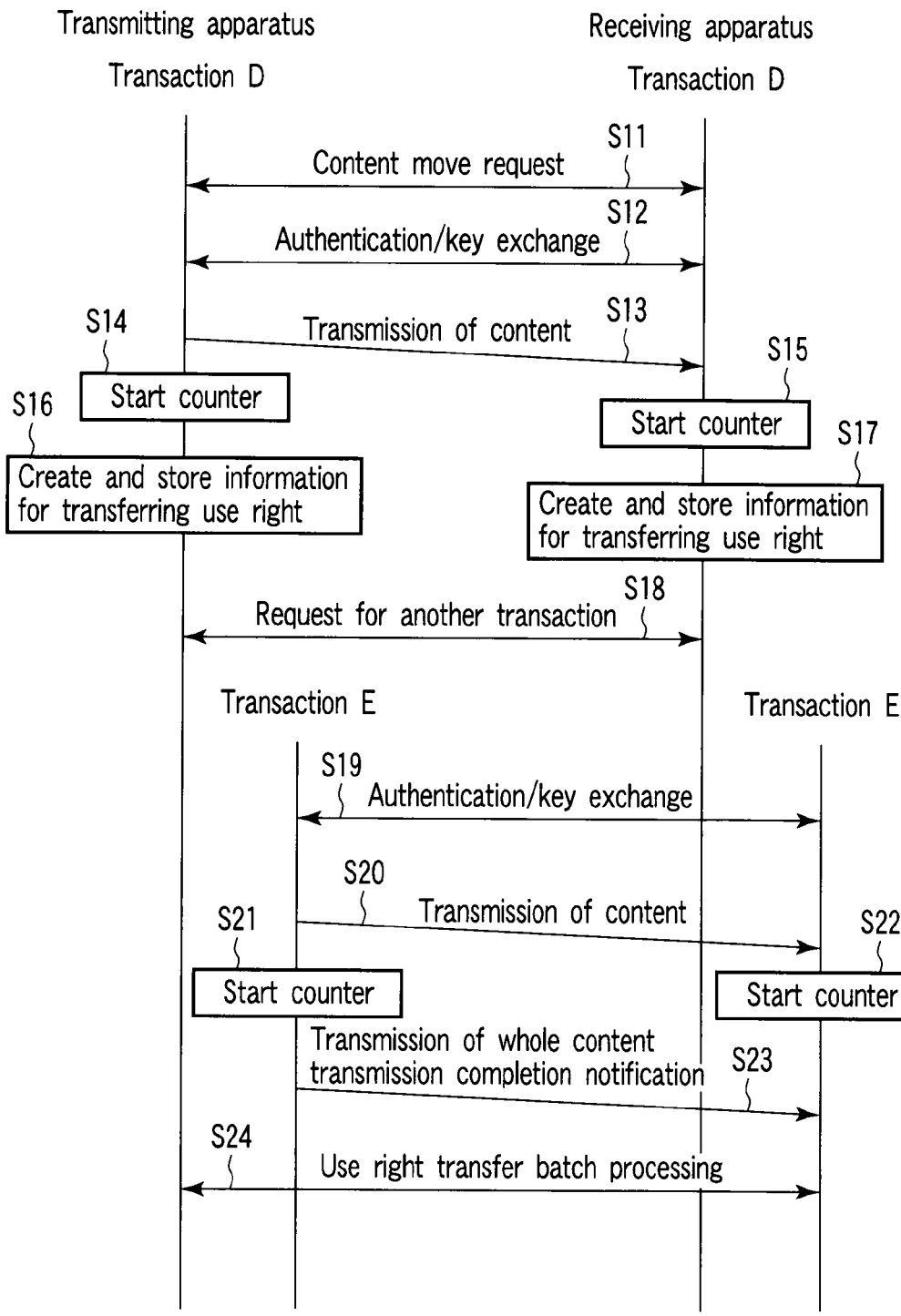
FIG. 4 is a sequence chart showing an example of the processing procedure of the content transmitting/receiving system.

Although another transaction is requested using transaction D in FIG. 4, it may be requested using another connection.

Furthermore, another transaction may utilize the same connection as that of transaction D by using HTTP persistent connections or may utilize another connection.

Subsequently, when the transmitting apparatus 2 or receiving apparatus 4 issues a request for another transaction as described above, authentication/key exchange processing is executed between the transmitting apparatus 2 and receiving apparatus 4 (step S19), and the other transaction starts.

Let K2 be a secret key which is shared by executing the authentication/key exchange processing, and E be an identifier of the started transaction.

As shown in FIG. 6, the transmitting apparatus 2 and receiving apparatus 4 respectively associate the content identifier (C) with the transaction identifier (D) and the transaction identifier (E) to manage them.

When the authentication/key exchange processing for transaction E succeeds, content transmitting/receiving processing (step S20) and counter processing (steps S21 and S22) are executed, as in the case of transaction D described above. At this time, the content processing unit 41 of the receiving apparatus 4 stores the content in an unusable state, as described above. It is desirable to continuously store the content received using transaction E at a position subsequent to that at which the content received using transaction D is stored.

In the counter processing (steps S21 and S22) in transaction E, let E1 be a counter of the transmitting apparatus 2, and E2 be a counter of the receiving apparatus 4.

As in the case of transaction D described above, each of the transmitting apparatus 2 and receiving apparatus 4 monitors the corresponding counter (counter E1 for the transmitting apparatus 2 or counter E2 for the receiving apparatus 4) while packetizing and transferring the content. If "the transmission/reception of the whole content is not completed" and "the counter exceeds a predetermined value", the apparatuses 2 and 4 respectively create and store information for transferring a use right, and requests another new transaction to the transmitting or receiving apparatus as a communication partner. While the transmission/reception of the whole content is not completed, the authentication/key exchange processing, content transmitting/receiving processing, and counter processing are repeated.

That is, while the transmission/reception of the whole content is not completed, the following processing is repeated. If "the transmission/reception of the whole content is not completed" and "the counter exceeds a predetermined value" when the nth transaction is used, that transaction is switched to the (n+1)th transaction. At this time, it is desirable to repeat the processing of continuously storing a content received using the (n+1)th transaction at a position subsequent to that at which a content received using the nth transaction is stored.

On the other hand, when the transmitting apparatus 2 completes the transmission of the whole content, the whole content transmission completion processing unit 25 notifies the receiving apparatus 4 that "the transmission of the whole content is complete" (step S23). The use right transfer processing unit 26 creates and stores information for transferring a use right, as needed, and the control transits to use right transfer processing by the use right transfer processing unit 26 (step S24). In the receiving apparatus 4, when the whole content reception completion processing unit 45 receives the notification from the transmitting apparatus 2 that "the transmission of the whole content is complete" (step S23), the use right transfer information storing unit 46 creates and stores information for transferring a use right, as needed, and the control transits to use right transfer batch processing by the use right transfer batch processing unit 47 (step S24).

In the example of FIG. 7, the information contains the identifier of the content to be moved, the identifiers of the transactions used to move the content, and information for specifying the secret key used in each transaction. The information for specifying the secret key represents, e.g., the number of the secret key and a value calculated from the secret key. The value calculated from the secret key is a hash value calculated from the secret key in the example of FIG. 7.

In the use right transfer processing, the content stored in the transmitting apparatus 2 is set to an unusable state (invalid state), and the content stored in the receiving apparatus 4 is set to a usable state (valid state). For example, the transmitting apparatus 2 changes the flag corresponding to the content to indicate an invalid state. The receiving apparatus 4 changes the flag corresponding to the content to indicate a valid state.

Referring to FIG. 4, the transmitting apparatus 2 notifies the receiving apparatus 4 using the connection of transaction E in step S23 that "the transmission of the whole content is complete". The apparatus 2, however, may notify the apparatus 4 of it using the connection of transaction D or another connection.

A method which omits the notification in step S23 that "the transmission of the whole content is complete" is also available. That is, since the receiving apparatus 4 can know the size of the content to be moved at the start of a transaction, the apparatus 4 can also know from the size of the received content that "the reception of the whole content is complete" even if the transmitting apparatus 2 does not send the notification. The transmitting apparatus 2 can therefore start the use right transfer processing when confirming that "the reception of the whole content is complete".

Figure 8:
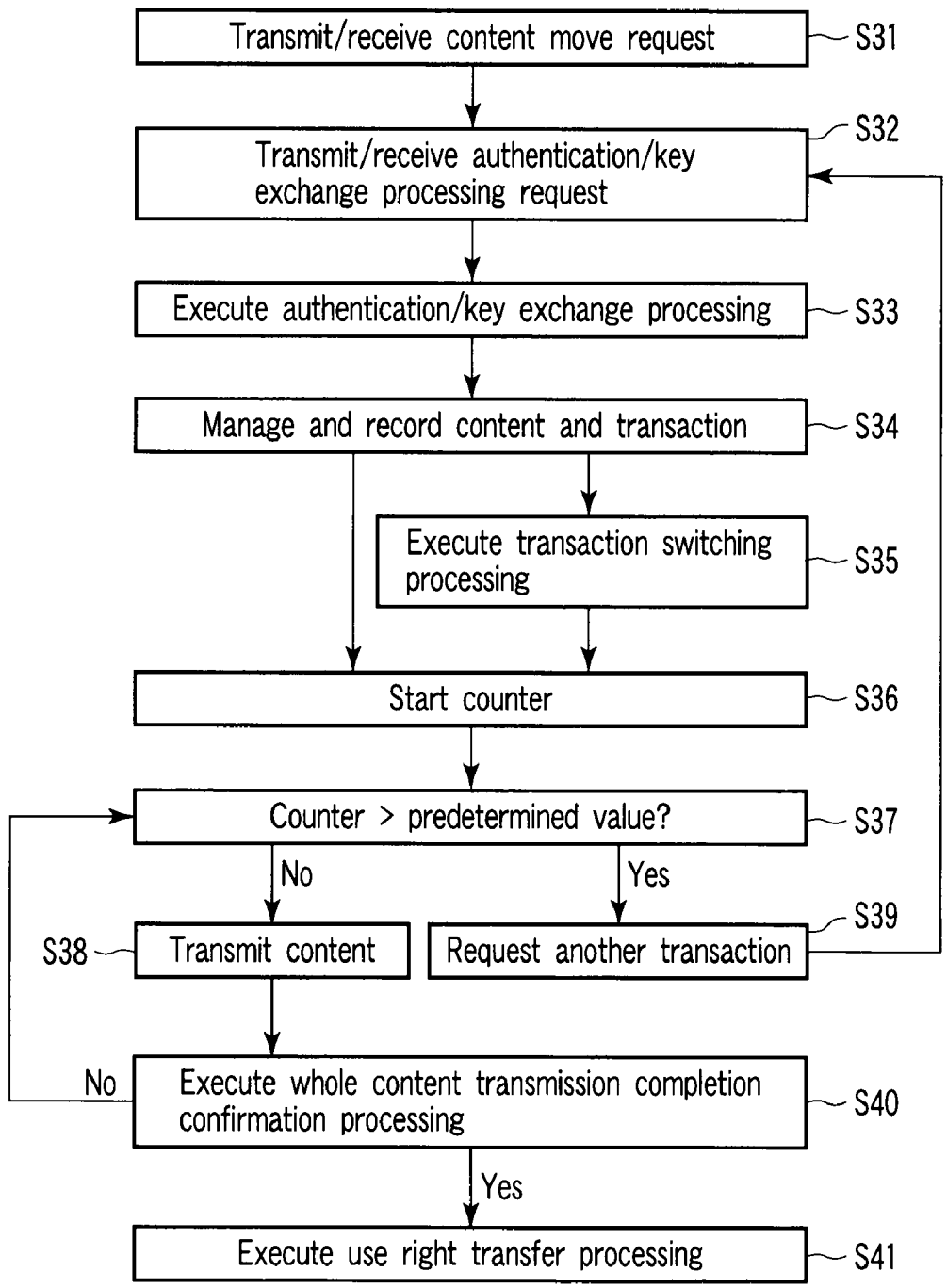
FIG. 8 is a flowchart showing an example of the processing procedure of the transmitting apparatus.

There will now be described an example of the processing procedure of the transmitting apparatus 2 referring to FIG. 8.

The transmitting apparatus 2 starts content move processing upon reception of a content move request from the receiving apparatus 4 or transmission of a content move request to the receiving apparatus 4 (step S31).

The apparatus 2 then starts authentication/key exchange processing upon reception of an authentication/key exchange processing request from the receiving apparatus 4 or transmission of an authentication/key exchange processing request to the receiving apparatus 4 (steps S32 and S33).

Upon completion of the authentication/key exchange processing, the apparatus 2 manages and records a content and transaction (step S34), and starts a counter (step S36).

If the counter does not exceeds a predetermined value (step S37), the apparatus 2 transmits the content (step S38).

The apparatus 2 determines whether the transmission of the whole content is completed (step S40). If the transmission is not completed, the apparatus 2 continues to transmit the content.

If the counter exceeds the predetermined value (step S37), the apparatus 2 requests another transaction to the receiving apparatus 4 (step S39), and starts authentication/key exchange processing.

If the apparatus 2 executes the authentication/key exchange processing by the request for another transaction, it performs transaction switching processing, and transmits the remaining part of the content using the other transaction (step S35).

Upon completion of the transmission of the whole content, the apparatus executes use right transfer processing (step S41).

Figure 9:
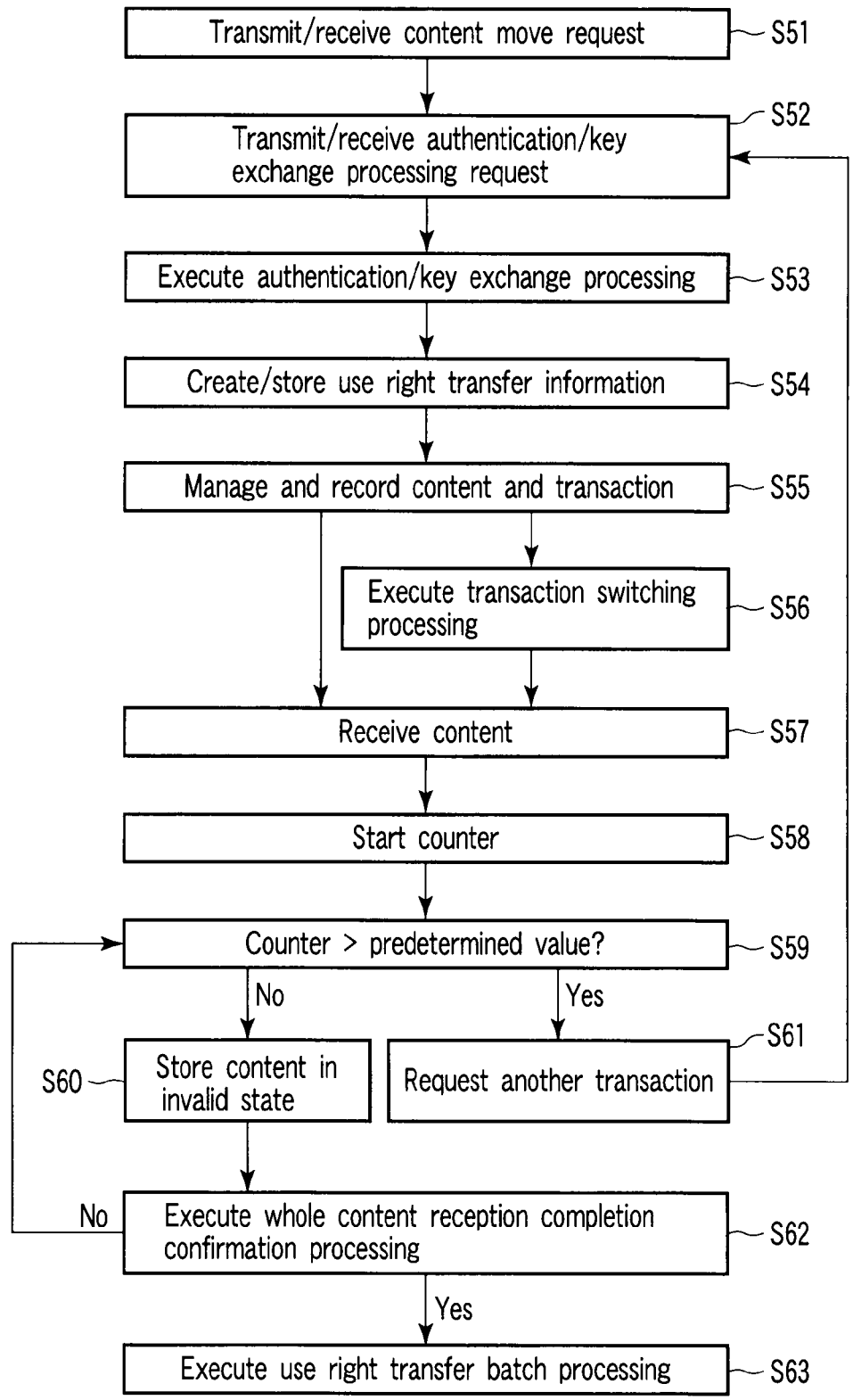
FIG. 9 is a flowchart showing an example of the processing procedure of the receiving apparatus.

There will be described an example of the processing procedure of the receiving apparatus 4 referring to FIG. 9.

The receiving apparatus 4 starts content move processing upon reception of a content move request from the transmitting apparatus 2 or transmission of a content move request to the transmitting apparatus 2 (step S51).

The apparatus 4 then starts authentication/key exchange processing upon reception of an authentication/key exchange processing request from the transmitting apparatus 2 or transmission of an authentication/key exchange processing request to the transmitting apparatus 2 (steps S52 and S53).

Upon completion of the authentication/key exchange processing, the apparatus 4 creates and stores information for executing use right transfer processing (step S54).

The apparatus 4 manages and records a content and transaction (step S55). The apparatus 4 starts receiving the content, and starts a counter (steps S57 and S58).

If the counter does not exceed a predetermined value (step S59), the apparatus 4 stores the content in an unusable state (invalid state) (step S60).

The apparatus 4 determines whether the reception of the whole content is completed (step S62). If the reception is not completed, the apparatus 4 continues to receive the content.

If the counter exceeds the predetermined value (step S59), the apparatus 4 requests another transaction to the transmitting apparatus 2 (step S61), and starts authentication/key exchange processing.

If the apparatus 4 executes the authentication/key exchange processing by the request for another transaction, it performs transaction switching processing (S56), and receives the remaining part of the content using the other transaction.

Upon completion of the reception of the whole content, the apparatus 4 executes use right transfer batch processing (step S63).

<Use Right Transfer Processing 1>

Figure 10:
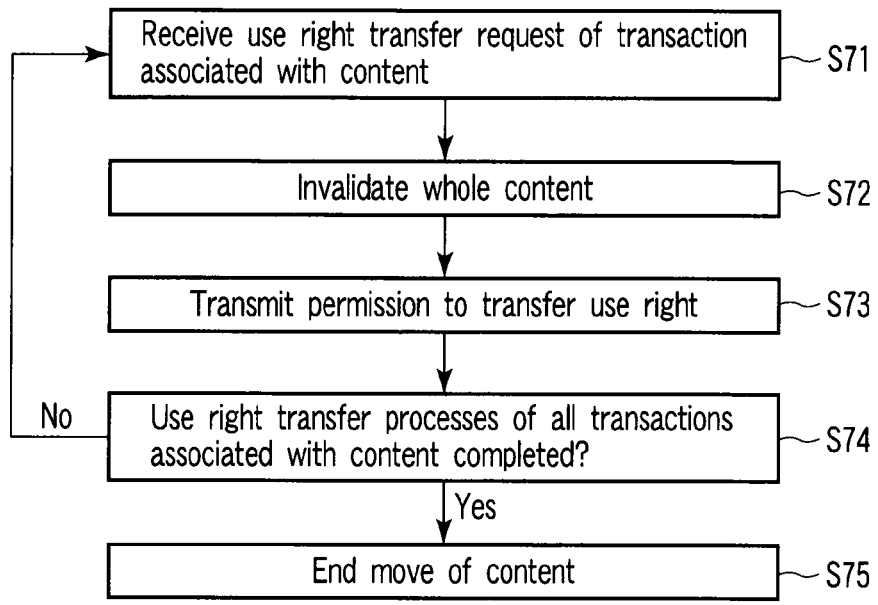
FIG. 10 is a flowchart showing an example of use right transfer processing in the transmitting apparatus.

There will be described an example of the procedure of the use right transfer processing of the transmitting apparatus 2 referring to FIG. 10.

In this example of the procedure, upon reception of a use right transfer request of any one of the transactions associated with the content, the apparatus 2 immediately sets the whole content to an unusable state (invalid state).

The transmitting apparatus 2 waits for reception of a use right transfer request of a transaction associated with the content from the receiving apparatus 4. Upon reception of a use right transfer request of a transaction associated with the content from the receiving apparatus 4 (step S71), the apparatus 2 sets the whole target content to an unusable state (invalid state) (step S72). The apparatus 2 then transmits a content use right transfer permission to the receiving apparatus 4 (step S73).

If the transfer processing of all the transaction use rights associated with the content is completed (step S74), the move of the content is completed, and the content move processing ends (step S75).

<Use Right Transfer Processing 2>

Figure 11:
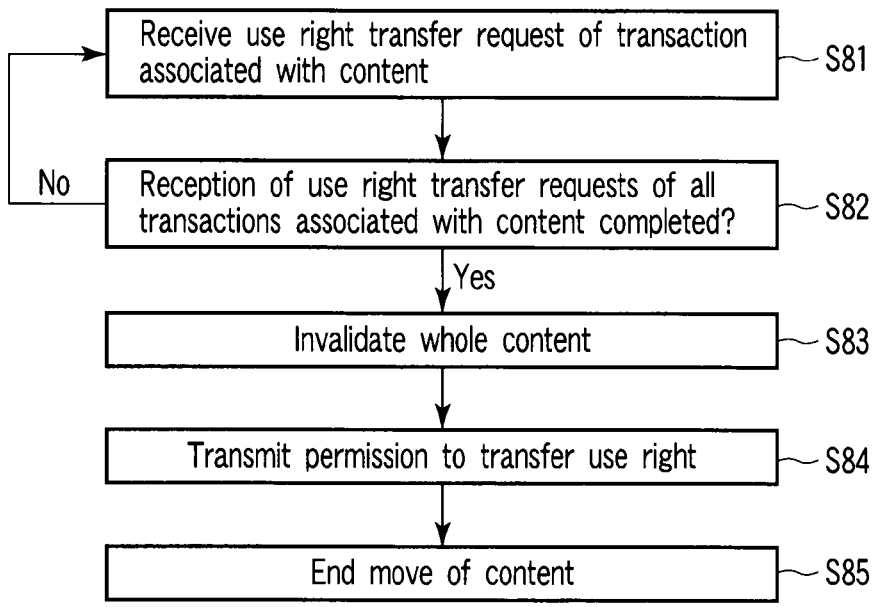
FIG. 11 is a flowchart showing another example of the use right transfer processing in the transmitting apparatus.

There will be described another example of the procedure of the use right transfer processing of the transmitting apparatus 2 referring to FIG. 11.

In this example of the procedure, upon reception of the use right transfer requests of all the transactions associated with the content, the apparatus 2 sets the whole content to an unusable state (invalid state).

The transmitting apparatus 2 waits for reception of a use right transfer request of a transaction associated with the content from the receiving apparatus 4. Upon reception of the use right transfer requests of all the transactions associated with the content from the receiving apparatus 4 (steps S81 and S82), the apparatus 2 sets the whole target content to an unusable state (invalid state) (step S83). The apparatus 2 then transmits a content use right transfer permission to the receiving apparatus 4 (step S84). Since the move of the content is completed, the content move processing ends (step S85).

<Use Right Transfer Batch Processing>

Figure 12:
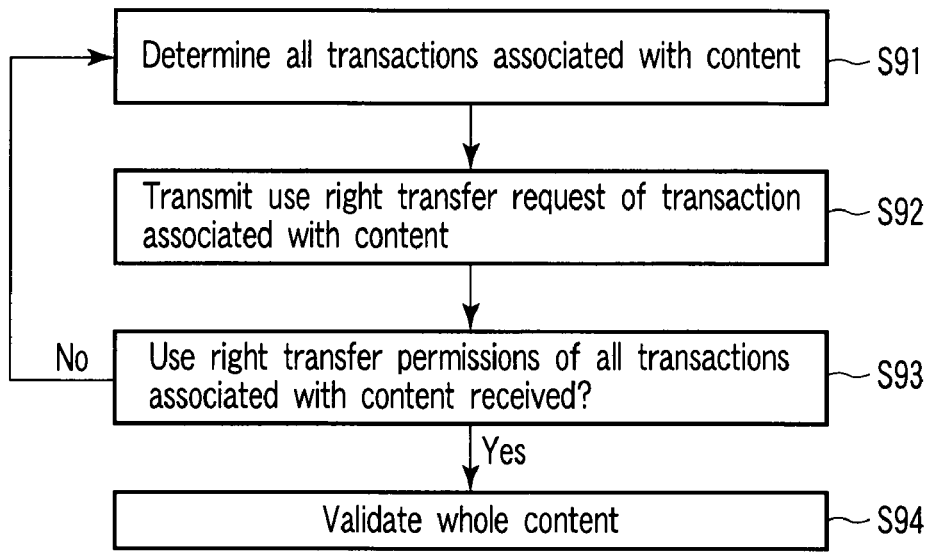
FIG. 12 is a flowchart showing an example of use right transfer batch processing in the receiving apparatus.

There will be described an example of the procedure of the use right transfer batch processing of the receiving apparatus 4 referring to FIG. 12.

In this example of the procedure, use right transfer processes of all the transactions associated with the content are collectively executed.

The receiving apparatus 4 determines all the transactions associated with the content (step S91), and transmits a use right transfer request of each transaction to the transmitting apparatus 2 (step S92). If the receiving apparatus 4 does not receive use right transfer permissions of all the transactions associated with content (step S93), it determines all the transactions associated with the content, and continuously transmits a use right transfer request of each transaction.

If the apparatus 4 receives use right transfer permissions of all the transactions (step S93), it sets the whole content to a usable state (valid state) (step S94). Since the move of the content is completed, the content move processing ends.

In the use right transfer batch processing, the use right transfer processes of all the transactions associated with the content are individually executed. However, the use right transfer batch processing may be implemented by controlling the processes to be collectively executed by an application (layer) instead.

As described above, in this embodiment, after the start of moving a content from a transmitting apparatus to a receiving apparatus, if a progress quantity representing a degree of progress of transmission of the content exceeds a predetermined value, a transaction is switched to another, and the content is continuously moved. This makes it possible to securely move the content from the transmitting apparatus to the receiving apparatus even if a secret key is discarded.

(Second Embodiment)

As for the second embodiment, the different points from the first embodiment will be mainly described below.

In this embodiment, assume that a content to be moved contains "digital data not requiring copyright protection" as well as "digital data requiring copyright protection". Assume also that when transferred from a transmitting apparatus 2 to a receiving apparatus 4, "digital data not requiring copyright protection" is transferred without encryption.

Figure 13:
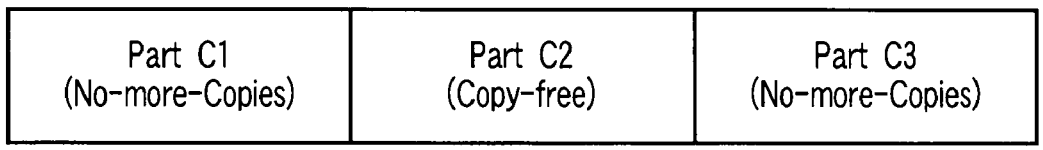
FIG. 13 is a view for explaining an example of the state of the copy control information of contents.

FIG. 13 shows, as an example of such content, content C containing a plurality of portions with different pieces of copy control information. This content C has content Part C1 with copy control information "No-more-Copies" as the first portion, content Part 2 with copy control information "Copy-free" as the next portion, and content Part C3 with copy control information "No-more-Copies" as the last portion. In this embodiment, content Part C1 and content Part C3 are moved after encryption for copyright protection. Content Part C2 is moved without encryption.

In this embodiment, to move a content from the transmitting apparatus 2 to the receiving apparatus 4, the following control is generally executed. That is, after the start of moving the content from the transmitting apparatus 2 to the receiving apparatus 4, if a progress quantity representing a degree of progress of transmission or reception of the content from when the apparatus 2 starts moving the content without encryption (i.e., a secret key is not used) exceeds a predetermined value, and "digital data requiring copyright protection" has to be moved (i.e., a new secret key is needed), the transmitting apparatus 2 or receiving apparatus 4 executes transaction switching and moves the content. In this embodiment, a plurality of transactions may be switched, as in the first embodiment.

As shown in FIG. 14, the transmitting apparatus 2 comprises a content supply unit 21, authentication/key exchange processing unit 22, transaction/content division managing unit 23, counter processing unit 24, whole content transmission completion processing unit 25, use right transfer processing unit 26, encryption processing unit 28, copy control information processing unit 29, packet processing unit 30, communication processing unit 31, and network interface unit 32.

Each of the content supply unit 21, authentication/key exchange processing unit 22, transaction/content division managing unit 23, whole content transmission completion processing unit 25, use right transfer processing unit 26, encryption processing unit 28, packet processing unit 30, communication processing unit 31, and network interface unit 32 basically has the same function as that of the corresponding block of the transmitting apparatus 2 in the first embodiment.

Upon detection of "digital data not requiring copyright protection", i.e., a "portion not requiring encryption", of the content, the copy control information processing unit 29 requests to count. Thereafter, upon detection of "digital data requiring copyright protection", i.e., a "portion requiring encryption", the unit 29 requests transaction switching.

When the copy control information processing unit 29 requests to count, the counter processing unit 24 starts counting a progress quantity representing a degree of progress of transmission of the content (e.g., a transmission time or transmitted data amount). If the progress quantity exceeds a predetermined value (e.g., when the transmission time exceeds a predetermined period of time or the transmitted data amount exceeds a predetermined data amount), the unit 24 requests a new transaction when the "digital data requiring copyright protection" has to be moved (i.e., a new secret key is needed).

If "digital data requiring copyright protection" has to be moved (i.e., a secret key is used again) before the counter exceeds the predetermined value, the counter may stop.

As shown in FIG. 15, the receiving apparatus 4 comprises a content processing unit 41, authentication/key exchange processing unit 42, transaction/content division managing unit 43, counter processing unit 44, whole content reception completion processing unit 45, use right transfer information storing unit 46, use right transfer batch processing unit 47, encryption processing unit 48, copy control information detecting unit 49, packet processing unit 50, communication processing unit 51, and network interface unit 52.

Each of the content processing unit 41, whole content reception completion processing unit 45, use right transfer information storing unit 46, and use right transfer batch processing unit 47 basically has the same function as that of the corresponding block of the receiving apparatus 4 in the first embodiment.

Each of the authentication/key exchange processing unit 42, transaction/content division managing unit 43, encryption processing unit 48, packet processing unit 50, communication processing unit 51, and network interface unit 52 basically has the same function as that of the corresponding block of the receiving apparatus 4 in the first embodiment or the transmitting apparatus 2 in FIG. 14.

Upon detection of "digital data not requiring copyright protection", i.e., a "portion not requiring encryption", of the content, the copy control information detecting unit 49 requests to count. Thereafter, upon detection of "digital data requiring copyright protection", i.e., a "portion requiring encryption", the unit 49 requests transaction switching, and requests to create and store information to be used in use right transfer processing.

When the copy control information detecting unit 49 requests to count, the counter processing unit 44 starts counting a progress quantity representing a degree of progress of reception of the content (e.g., a reception time or received data amount). If the progress quantity exceeds a predetermined value (e.g., when the reception time exceeds a predetermined period of time or the received data amount exceeds a predetermined data amount), the unit 44 requests a new transaction when the "digital data requiring copyright protection" has to be moved (i.e., a new secret key is needed).

If the "digital data requiring copyright protection" has to be moved (i.e., a secret key is used again) before the counter exceeds the predetermined value, the counter may stop.

Although both the transmitting apparatus 2 and receiving apparatus 4 have counter processing units, only one of the transmitting apparatus 2 and receiving apparatus 4 may have a counter processing unit.

A case in which the transmitting apparatus 2 moves content C in FIG. 13 to the receiving apparatus 4 will be described below with reference to FIG. 16.

<Authentication/Key Exchange Processing>

As in the first embodiment, when a content move request is issued from the transmitting apparatus 2 to the receiving apparatus 4 (or from the receiving apparatus 4 to the transmitting apparatus 2) (step S101), authentication/key exchange processing is executed between the authentication/key exchange processing unit 22 of the transmitting apparatus 2 and the authentication/key exchange processing unit 42 of the receiving apparatus 4 (step S102) and a transaction starts.

Assume that a content to be moved is the content (content identifier C) in FIG. 13. Let D be an identifier of the started transaction, and K1 be a secret key (to be used in transaction D) which is shared between the transmitting apparatus 2 and receiving apparatus 4 by executing the authentication/key exchange processing.

The transaction/content division managing unit 23 of the transmitting apparatus 2 and the transaction/content division managing unit 43 of the receiving apparatus 4 respectively manage the content identifier (C) and the transaction identifier (D) in association with each other, as shown in FIG. 5. At this time, it is desirable to lock the content so that even if another receiving apparatus issues a content move request for the same content, the transmitting apparatus 2 can deny the request.

<Content Transmitting/Receiving Processing>

When the authentication/key exchange processing in transaction D succeeds, the copy control information processing unit 29 of the transmitting apparatus 2 checks the copy control information of content C supplied from the content supply unit 21. If the unit 29 detects content Part C1 as "digital data requiring copyright protection", i.e., a "portion requiring encryption", the encryption processing unit 28 encrypts the content using secret key K1 shared with the receiving apparatus 4, and the packet processing unit 30 packetizes the content into a predetermined packet. The transmitting apparatus 2 then transmits the packet to the receiving apparatus 4 via the communication processing unit 31 and network interface unit 32 (step S103).

When the receiving apparatus 4 receives the packet via the network interface unit 52 and communication processing unit 51, the packet processing unit 50 extracts encrypted content Part C1 from the packet. The encryption processing unit 48 decrypts the encrypted content using secret key K1 shared with the transmitting apparatus 2 to return it to the original content, and outputs the content to the content processing unit 41 (step S103). Note that the content processing unit 41 of the receiving apparatus 4 stores content Part C1 in an unusable state.

The transmitting apparatus 2 checks the copy control information of content C. If the apparatus 2 detects content Part C2 as "digital data not requiring copyright protection", i.e., a "portion not requiring encryption", it starts transmitting the content without encryption (step S104). Since secret key K1 is not used, the counter processing unit 24 starts a counter (D1) corresponding to transaction D (step S105).

Upon start of receiving content Part C2 as a "non-encrypted portion" (step S104), the counter processing unit 44 of the receiving apparatus 4 starts a counter (D2) corresponding to transaction D (step S106).

Note that the above counters may be, e.g., a time counter which counts the time taken for the transmission or reception, or a data size counter which counts a transmitted or received data amount.

The content processing unit 41 of the receiving apparatus 4 may store content Part C2 as a "non-encrypted portion" in a usable state at this time, or may store it in an unusable state at this time and changes it to a usable state in use right transfer processing. It is desirable to continuously store content Part C2 at a position subsequent to that at which content Part C1 is stored.

<Counter Processing>

Each of the transmitting apparatus 2 and receiving apparatus 4 monitors the corresponding counter (counter D1 for the transmitting apparatus 2 or counter D2 for the receiving apparatus 4) while transmitting/receiving content C. If "the transmission of the whole content is not completed" and "the counter exceeds a predetermined value", the use right transfer processing unit 26 and the use right transfer information storing unit 46 respectively create and store information for transferring a use right (steps S107 and S108). The transaction/content division managing unit 23 or transaction/content division managing unit 43 requests another new transaction to a communication partner (the receiving apparatus 4 or transmitting apparatus 2) (step S109). If, however, the communication partner (the receiving apparatus 4 or transmitting apparatus 2) has already requested another new transaction, the unit 23 or 43 need not request another new transaction.

The processing of creating and storing information for transferring a use right needs to be executed before the secret key is discarded. The processing may be therefore performed immediately after the authentication/key exchange processing or after a request for another transaction.

Figure 16:
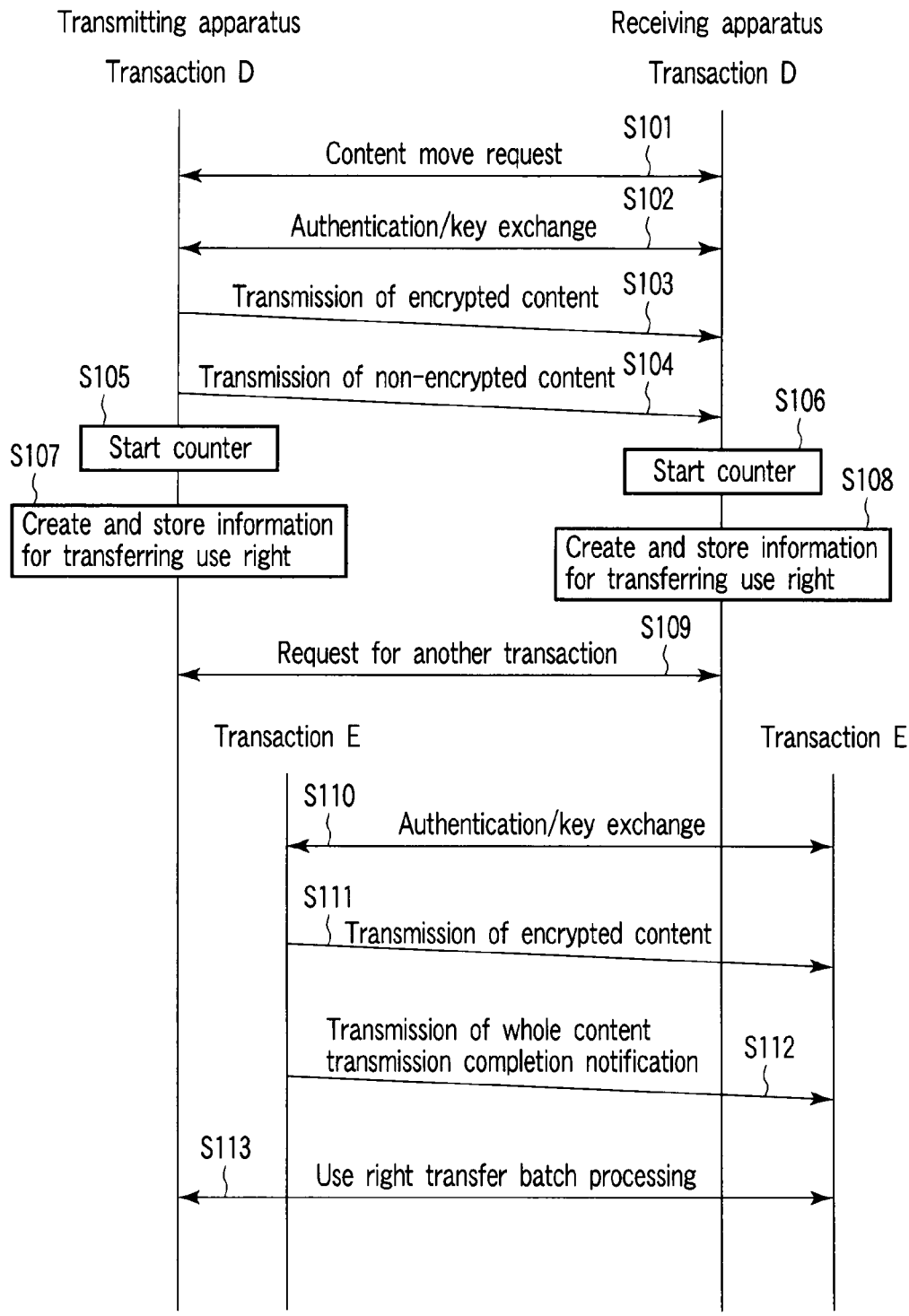
FIG. 16 is a sequence chart showing an example of the processing procedure of a content transmitting/receiving system according to the second embodiment.

Although another transaction is requested using transaction D in FIG. 16, it may be requested using another connection.

Furthermore, the other transaction may utilize the same connection as that of transaction D by using HTTP persistent connections or may utilize another connection.

Subsequently, when the transmitting apparatus 2 or receiving apparatus 4 issues a request for another transaction as described above, authentication/key exchange processing is executed between the transmitting apparatus 2 and receiving apparatus 4 (step S110), and the other transaction starts.

Let K2 be a secret key which is shared by executing the authentication/key exchange processing, and E be an identifier of the started transaction.

As shown in FIG. 6, the transmitting apparatus 2 and receiving apparatus 4 respectively associate the content identifier (C) with the transaction identifier (D) and the transaction identifier (E) to manage them.

<Content Transmitting/Receiving Processing 2>

When the authentication/key exchange processing in transaction E succeeds, the copy control information processing unit 29 of the transmitting apparatus 2 checks the copy control information of content C supplied from the content supply unit 21, as in the above case of transaction D. If the unit 29 detects content Part C3 as "digital data requiring copyright protection", i.e., a "portion requiring encryption", the encryption processing unit 28 encrypts the content using secret key K2 shared with the receiving apparatus 4, and the packet processing unit 30 packetizes the content into a predetermined packet. The transmitting apparatus 2 then transmits the packet to the receiving apparatus 4 via the communication processing unit 31 and network interface unit 32 (step S111).

When the receiving apparatus 4 receives the packet via the network interface unit 52 and communication processing unit 51, the packet processing unit 50 extracts encrypted content Part C3 from the packet. The encryption processing unit 48 decrypts the encrypted content using secret key K2 shared with the transmitting apparatus 2 to return it to the original content, and outputs the content to the content processing unit 41 (step S111). Note that the content processing unit 41 of the receiving apparatus 4 stores content Part C3 in an unusable state. It is desirable to continuously store content Part C3 received in transaction E at a position subsequent to that at which content Part C1 and content Part C2 received in transaction D are stored.

If content C in FIG. 13 is moved, content C has content Part C3 as a "portion requiring encryption" at the end, transaction switching does not occur any more. Assume that content C contains a "portion not requiring encryption" following to content Part C3. The same processing is repeated. That is, counter processing starts, and if "the transmission of the whole content is not completed" and "the counter exceeds the predetermined value", another new transaction is established.

Upon completion of the transmission of whole content C, the transmitting apparatus 2 notifies the receiving apparatus 4 that "the transmission of the whole content is complete" (step S112). The use right transfer processing unit 26 creates and stores information for transferring a use right, as needed, and the control transits to use right transfer processing by the use right transfer processing unit 26 (step S113). In the receiving apparatus 4, when the whole content reception completion processing unit 45 receives the notification from the transmitting apparatus 2 that "the transmission of the whole content is complete" (step S112), the use right transfer information storing unit 46 creates and stores information for transferring a use right, as needed, and the control transits to use right transfer batch processing by the use right transfer batch processing unit 47 (step S113).

An example of information for transferring a use right is the same as that in FIG. 7. In the example of FIG. 7, the information contains the identifier of the content to be moved, the identifiers of the transactions used to move the content, and information for specifying a secret key used in each transaction. The information for specifying a secret key represents, e.g., the number of the secret key and a value calculated from the secret key. The value calculated from the secret key is a hash value calculated from the secret key in the example of FIG. 7.

Referring to FIG. 16, the transmitting apparatus 2 notifies the receiving apparatus 4 using the connection of transaction E that "the transmission of the whole content is complete". The apparatus 2, however, may notify the apparatus 4 of it using the connection of transaction D or another connection.

In the use right transfer batch processing, the use right transfer processes of all the transactions associated with the content are individually executed. However, the use right transfer batch processing may be implemented by controlling the processes to be collectively executed by an application (layer) instead.

Figure 17:
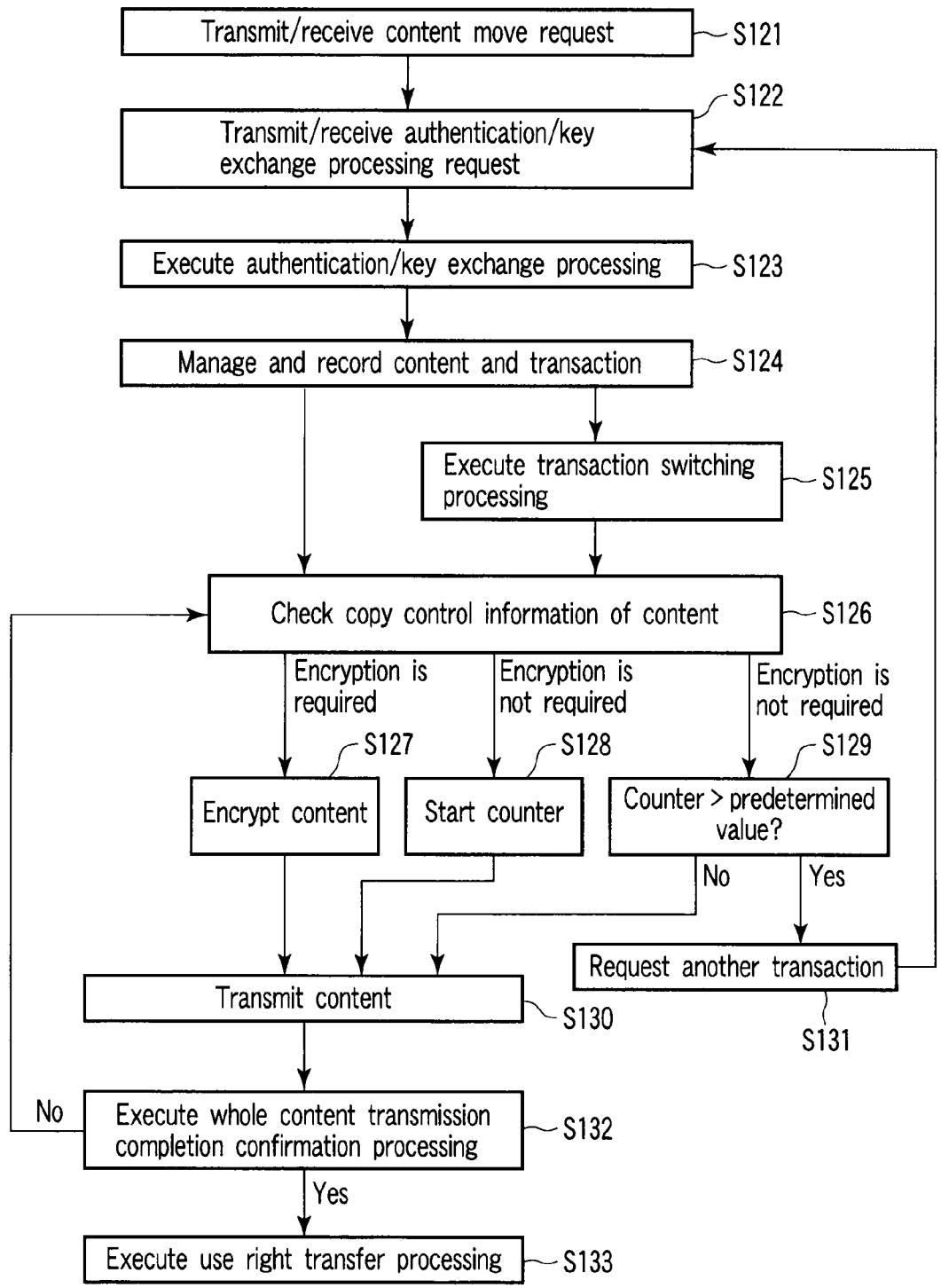
FIG. 17 is a flowchart showing an example of the processing procedure of the transmitting apparatus.

There will be described an example of the processing procedure of the transmitting apparatus 2 referring to FIG. 17.

The transmitting apparatus 2 starts content move processing upon reception of a content move request from the receiving apparatus 4 or transmission of a content move request to the receiving apparatus 4 (step S121).

The apparatus 2 then starts authentication/key exchange processing upon reception of an authentication/key exchange processing request from the receiving apparatus 4 or transmission of an authentication/key exchange processing request to the receiving apparatus 4 (steps S122 and S123).

Upon completion of the authentication/key exchange processing, the apparatus 2 manages and records a content and transaction (step S124), and checks the copy control information of the content (step S126). If encryption is required, the apparatus 2 transmits the content after encryption (step S127).

If encryption is not required, the apparatus 2 starts a counter (step S128).

If the counter does not exceed a predetermined value (step S129), the apparatus 2 transmits the content (step S130).

The apparatus 2 determines whether the transmission of the whole content is completed (step S132). If the transmission is not completed, the apparatus 2 checks the copy control information and continues to transmit the content. If the counter exceeds the predetermined value (step S129), the apparatus 2 requests another transaction to the receiving apparatus 4 (step S131), and starts authentication/key exchange processing. If the apparatus 2 executes the authentication/key exchange processing by the request for another transaction, it performs transaction switching processing, and transmits the remaining part of the content using the other transaction (step S125).

Upon completion of the transmission of the whole content (step S132), the apparatus 2 executes use right transfer processing (step S133).

Figure 18:
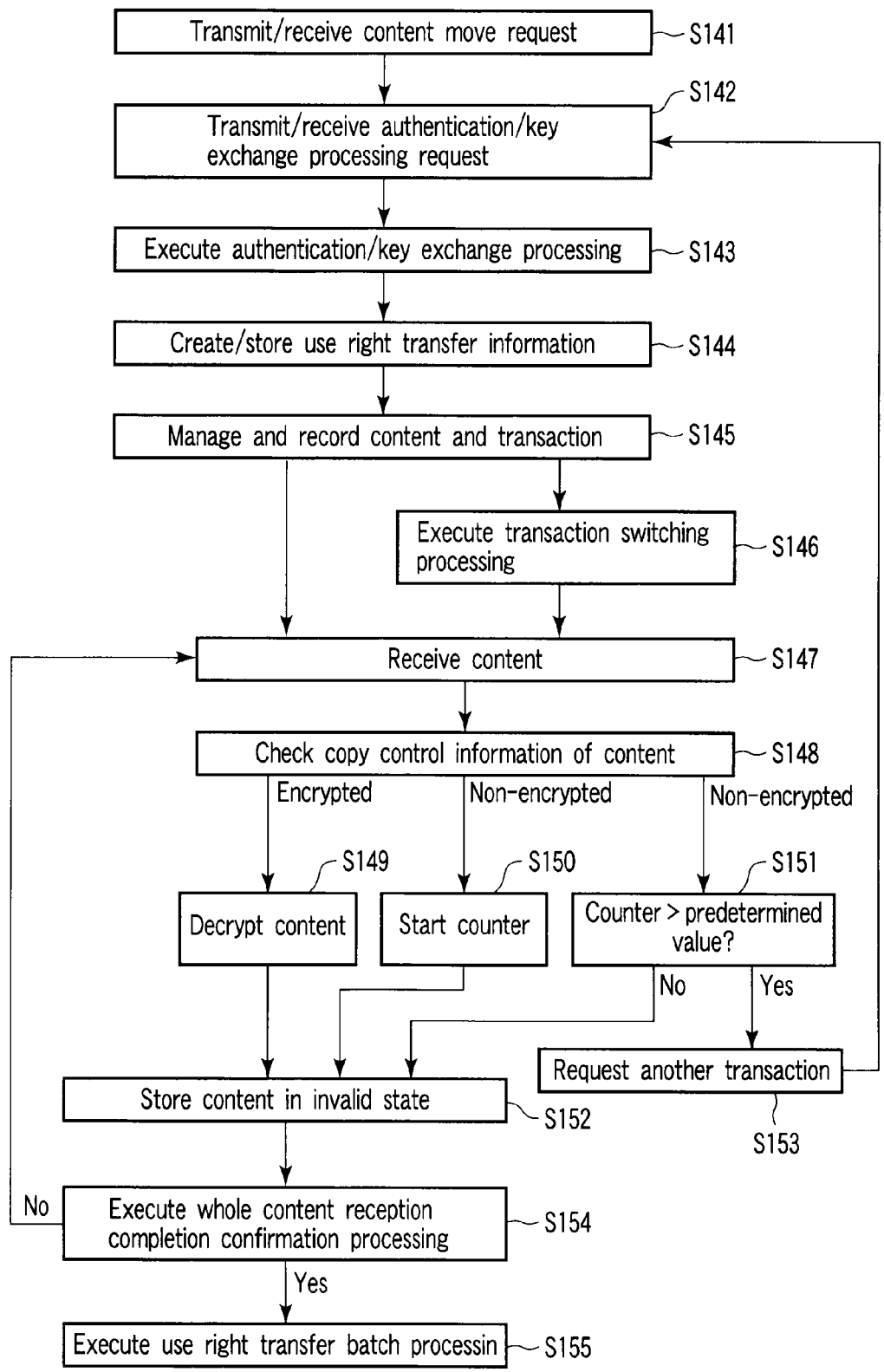
FIG. 18 is a flowchart showing an example of the processing procedure of the receiving apparatus.

FIG. 18 shows an example of the processing procedure of the receiving apparatus 4 according to this embodiment.

The receiving apparatus 4 starts content move processing upon reception of a content move request from the transmitting apparatus 2 or transmission of a content move request to the transmitting apparatus 2 (step S141).

The apparatus 4 then starts authentication/key exchange processing upon reception of an authentication/key exchange processing request from the transmitting apparatus 2 or transmission of an authentication/key exchange processing request to the transmitting apparatus 2 (steps S142 and S143).

Upon completion of the authentication/key exchange processing, the apparatus 4 creates and stores information for executing use right transfer processing (step S144).

The apparatus 4 manages and records a content and transaction (step S145), and starts receiving the content (step S147).

The apparatus 4 checks the copy control information (step S148). If the content is encrypted, the apparatus 4 decrypts the content (step S149); otherwise, the apparatus 4 starts a counter (step S150), and stores the content in an unusable state (invalid state) (step S152).

The apparatus 4 determines whether the reception of the whole content is completed (step S154). If the reception is not completed, the apparatus 4 continues to receive the content. If the counter exceeds a predetermined value (step S151), the apparatus 4 requests another transaction to the transmitting apparatus 2 (step S153), and starts the authentication/key exchange processing. If the apparatus 4 executes the authentication/key exchange processing by the request for another transaction, it performs transaction switching processing (S146), and receives the remaining part of the content using the other transaction.

Upon completion of the reception of the whole content (step S154), the apparatus 4 executes use right transfer batch processing (step S155).

The use right transfer processing of the transmitting apparatus 2 and the use right transfer batch processing of the receiving apparatus 4 are similar to those (FIG. 10 or 11, and FIG. 12) in the first embodiment, respectively.

In this embodiment, to move a content from the transmitting apparatus 2 to the receiving apparatus 4, transaction switching may be executed in the following case. That is, after the start of moving the content from the transmitting apparatus 2 to the receiving apparatus 4, a progress quantity representing a degree of progress of transmission or reception of the content from when the apparatus 2 starts moving the content without encryption (i.e., a secret key is not used) exceeds a predetermined value, and the move of the content is not completed, as in the first embodiment.

As described above, in this embodiment, after the start of moving a content from a transmitting apparatus to a receiving apparatus, if a progress quantity representing a degree of progress of transmission or reception of the content exceeds a predetermined value, a transaction is switched to another, and the content is continuously moved. This makes it possible to securely move the content from the transmitting apparatus to the receiving apparatus even if a secret key is discarded.

Note that the above-described functions can be described as software and executed by a computer having an appropriate mechanism.

The embodiment can be practiced as a program which causes a computer to execute a predetermined procedure, causes a computer to function as a predetermined means, or causes a computer to implement a predetermined function. The embodiment can also be practiced as a computer-readable recording medium which records the program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A transmitting apparatus for communicating with a receiving apparatus to move a content to be moved from the transmitting apparatus to the receiving apparatus using a plurality of consecutive transactions, comprising:
    a transaction transmitter that transmits the receiving apparatus the content, by using a current transaction established with the receiving apparatus;
    a counter that counts a progress quantity representing a degree of progress of the transmission of the content from a given point of time with respect to the transmission of the content corresponding to the current transaction to obtain a count value; and
    a transaction switch that switches the current transaction used for the transmission of the content to a subsequent transaction that is established newly with a subsequent part of the content from the current transaction, if the count value of the counter reaches a predetermined value and the transmission of the content is not completed,
    wherein the counter starts counting the progress quantity upon start of transmitting a specific portion of the content by the current transaction.

2. The apparatus according to claim 1, wherein if the transaction switch switches the current transaction used for the transmission of the content to the subsequent transaction, the transaction transmitter transmits the content to the receiving apparatus using the subsequent transaction.

3. The apparatus according to claim 1, wherein the counter counts the progress quantity from the given point of time with respect to the transmission of the content corresponding to an nth (n is an integer equal to or more than 2) transaction, and
    if the count value of the counter associated with the nth transaction reaches the predetermined value and the transmission of the content is not completed, the transaction switch switches the nth transaction used for the transmission of the content to an (n+1)th transaction.

4. The apparatus according to claim 1, wherein the counter immediately starts counting the progress quantity upon start of transmitting the content by the current transaction.

5. The apparatus according to claim 1, further comprising:
    a key exchange processor that executes key exchange processing to share a secret key with the receiving apparatus; and
    an encryption processor that encrypts the content using the secret key which is shared with the receiving apparatus by using the key exchange processing unit,
    wherein the content contains a portion to be encrypted before its transmission and a portion to be transferred without encryption, and
    the counter starts counting the progress quantity upon start of transmitting the portion to be transferred without encryption of the content after the start of transmitting the content by the current transaction.

6. The apparatus according to claim 5, wherein in a situation in which the count value of the counter reaches the predetermined value and the transmission of the content is not completed, if the portion to be encrypted before its transmission becomes a transmission target, the transaction switch switches the current transaction used for the transmission of the content to the subsequent transaction.

7. The apparatus according to claim 1, wherein the counter counts, as the progress quantity, a transmission time taken for the transmission of the content by the current transaction or a data amount of the content transmitted by the current transaction.

8. The apparatus according to claim 1, further comprising:
a content storage that stores the content;
a notification transmitter that transmits, upon completion of the transmission of the content, a notification to the receiving apparatus that the transmission of the content is complete;
a request receiver that receives from the receiving apparatus a request to transfer a use right of the content after transmitting the notification to the receiving apparatus; and
a use right transfer processor that invalidates, upon reception of the request from the receiving apparatus, the use right of the content stored in the content storage and transmit to the receiving apparatus a permission to validate the use right of the content.

9. The apparatus according to claim 8, wherein the receiving apparatus transmits the request for each of the transactions associated with the content, and
upon reception of the request corresponding to any one of the transactions associated with the content, the use right transfer processor invalidates the use right of the content stored in the content storage, and transmits the permission to the receiving apparatus.

10. The apparatus according to claim 8, wherein the receiving apparatus transmits the request for each of the transactions associated with the content, and
upon reception of all the requests corresponding to the transactions associated with the content, the use right transfer processor validates the use right of the content stored in the content storage, and transmits the permission to the receiving apparatus.

11. A receiving apparatus for communicating with a transmitting apparatus to move a content to be moved from the transmitting apparatus to the receiving apparatus using a plurality of consecutive transactions, comprising:
a transaction receiver that receives from the transmitting apparatus the content, by using a current transaction established with the transmitting apparatus;
a counter that counts a progress quantity representing a degree of progress of the reception of the content from a given point of time with respect to the reception of the content corresponding to the current transaction to obtain a count value; and
a transaction switch that switches the current transaction used for the reception of the content to a subsequent transaction that is established newly with a subsequent part of the content from the current transaction, if the count value of the counter reaches a predetermined value and the reception of the content is not completed,
wherein the counter starts counting the progress quantity upon start of receiving a specific portion of the content by the current transaction.

12. The apparatus according to claim 11, wherein if the transaction switch switches the current transaction used for the reception of the content to the subsequent transaction, the transaction receiver receives the content from the transmitting apparatus using the subsequent transaction.

13. The apparatus according to claim 11, wherein the counter counts the progress quantity from the given point of time with respect to the reception of the content corresponding to an nth (n is an integer equal to or more than 2) transaction, and
if the count value of the counter associated with the nth transaction reaches the predetermined value and the reception of the content is not completed, the transaction switch switches the nth transaction used for the reception of the content to an (n+1)th transaction.

14. The apparatus according to claim 11, wherein the counter immediately starts counting the progress quantity upon start of receiving the content by the current transaction.

15. The apparatus according to claim 11, further comprising:
a key exchange processor that executes key exchange processing to share a secret key with the transmitting apparatus; and
an encryption processor that decrypts the content, if the content is encrypted, using the secret key which is shared with the transmitting apparatus by using the key exchange processor,
wherein the content contains a portion to be encrypted before its transmission and a portion to be transferred without encryption, and
the counter starts counting the progress quantity upon start of receiving the portion to be transferred without encryption of the content after the start of receiving the content by the current transaction.

16. The apparatus according to claim 15, wherein in a situation in which the count value of the counter reaches the predetermined value and the reception of the content is not completed, if the portion to be encrypted before its transmission becomes a reception target, the transaction switch switches the current transaction used for the reception of the content to the subsequent transaction.

17. The apparatus according to claim 11, wherein the counter counts, as the progress quantity, a reception time taken for the reception of the content by the current transaction or a data amount of the content received by the current transaction.

18. The apparatus according to claim 11, further comprising:
a content storage that stores the received content;
a notification receiver that receives a notification from the transmitting apparatus that the transmission of the content is complete;
a request transmitter that transmits, upon reception of the notification, to the transmitting apparatus a request to transfer a use right of the content;
a permission receiver that receives, after transmitting the request to the transmitting apparatus, from the transmitting apparatus a permission to validate the use right of the content; and
a use right transfer processor that validates, upon reception of the permission from the receiving apparatus, the use right of the content stored in the content storage.

19. The apparatus according to claim 18, wherein the request transmitter transmits the request for each of the transactions associated with the content.

20. A content transmitting method for transmitting a content to be moved from a transmitting apparatus to a receiving apparatus using a plurality of consecutive transactions, comprising:
transmitting to the receiving apparatus the content to the receiving apparatus, by using a current transaction established with the receiving apparatus;
counting, by using a counter, a progress quantity representing a degree of progress of the transmission of the content from a given point of time with respect to the transmission of the content corresponding to the current transaction to obtain a count value; and
switching the current transaction used for the transmission of the content to a subsequent transaction that is established newly with a subsequent part of the content from the content transaction, if the count value of the counter reaches a predetermined value and the transmission of the content is not completed wherein the counting comprises starting the count of the progress quantity upon start of transmitting a specific portion of the content by the current transaction.

21. A non-transitory computer readable storage medium for moving a content to be moved from a transmitting apparatus to a receiving apparatus using a plurality of consecutive transactions, the non-transitory computer readable storage medium storing instructions of a computer program which when executed by a computer results in performance of:

transmitting to a receiving apparatus the content to the receiving apparatus, by using a current transaction established with the receiving apparatus;

counting, by using a counter, a progress quantity representing a degree of progress of the transmission of the content from a given point of time with respect to the transmission of the content by the current transaction; and switching the current transaction used for the transmission of the content to a subsequent transaction that is established newly with a subsequent part of the content from the current transaction, if a count value of the counter reaches a predetermined value and the transmission of the content is not completed, wherein the counting comprises starting the count of the progress quantity upon start of transmitting a specific portion of the content by the current transaction.

22. A non-transitory computer readable storage medium for moving a content to be moved from a transmitting apparatus to a receiving apparatus using a plurality of consecutive transactions, the non-transitory computer readable storage medium storing instructions of a computer program which when executed by a computer results in performance of:

receiving from a transmitting apparatus the content, by using a current transaction established with the transmitting apparatus;

counting, by using a counter, a progress quantity representing a degree of progress of the reception of the content from a given point of time with respect to the reception of the content by the current transaction; and switching the current transaction used for the reception of the content to a subsequent transaction that is established newly with a subsequent part of the content from the current transaction, if a count value of the counter reaches a predetermined value and the reception of the content is not completed, wherein the counting comprises starting the count of the progress quantity upon start of receiving a specific portion of the content by the current transaction.

* * * * *